C. S. COLE.
ELECTRIC STORAGE BATTERY.
APPLICATION FILED JULY 10, 1907.
910,991.
Patented Jan. 26, 1909.
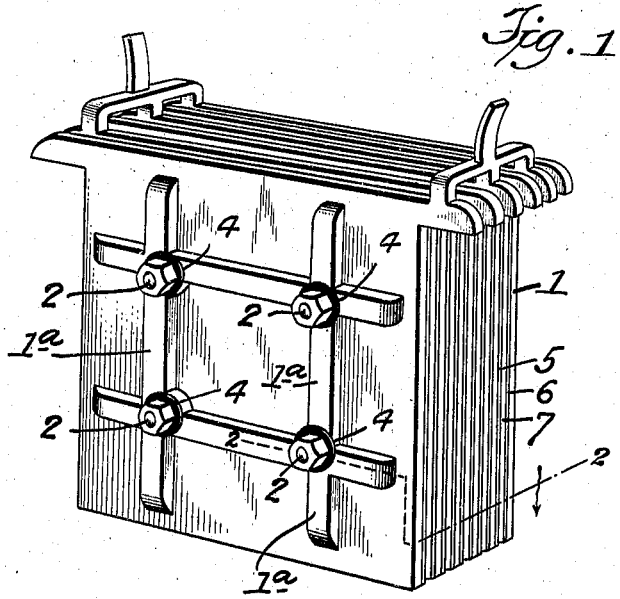
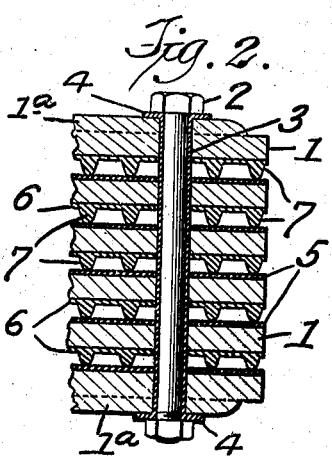
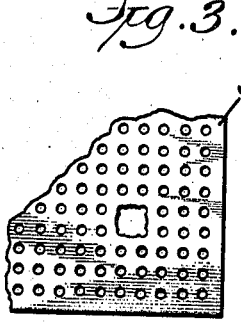
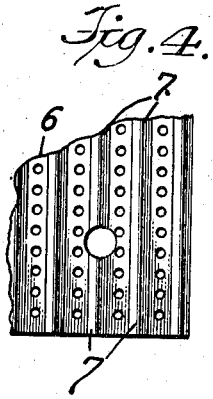
WITNESSES:
INVENTOR
Charles S. Cole
BY
Baxter Morton
ATTORNEY

UNITED STATES PATENT OFFICE.

CHARLES S. COLE, OF SANDY HOOK, CONNECTICUT.

ELECTRIC STORAGE BATTERY.

No. 910,991.  Specification of Letters Patent.  Patented Jan. 26, 1909.

Application filed July 10, 1907. Serial No. 382,986.

*To all whom it may concern:*

Be it known that I, CHARLES S. COLE, a citizen of the United States, residing at Sandy Hook, in the county of Fairfield and State of Connecticut, have invented a new and useful Improvement in Electric Storage Batteries, of which the following is a specification.

This invention relates to electric storage batteries and has for its object the provision of improved means for assembling the "elements" of electric storage batteries so that they may be handled as a unit and so that deterioration of the elements by buckling, separation of the coating from the backing, and the like, will be prevented.

The invention also contemplates the provision of means for assembling the elements of an electric storage battery in such a way that the elements will be securely held without preventing access of the electrolyte to the elements and without interfering with the expansion and contraction of the elements which occur in the ordinary use of an electric storage battery.

In the accompanying drawings I have illustrated a preferred form of my invention, but it will be understood that variations in the structure may be resorted to within the scope of the appended claims.

In the drawings: Figure 1 is a perspective view of a group of elements for a storage battery cell assembled in accordance with the present invention; Fig. 2 is a section on the line 2—2 of Fig. 1; Fig. 3 is a detail view of one of the flat perforated separator plates; Fig. 4 is a detail view of one of the perforated ribbed separator plates.

In practicing my invention, the coated lead plates 1 which constitute the "elements" of the battery are pierced at suitable points, preferably near the corners, to permit the passage of bolts 2 which serve to bind the elements together. The outer plates are preferably stiffened with two pairs of ribs 1ª, one pair of ribs extending horizontally and the other pair extending vertically, the two pairs of ribs intersecting at the point where the plates are pierced for the passage of the binding bolts 2. The bolts 2 must, of course, be insulated from the elements of the battery. This may be done by the use of rubber sleeves 3 and washers 4, as shown in Fig. 2. Or, if the bolts themselves are made of rubber or other non-conducting material, the insulating sleeves and washers may be dispensed with.

The battery elements, which are illustrated diagrammatically only, are of any desired construction, and no novelty is claimed for them. Between the series of plates forming the elements of the cell, however, I employ spacers or separators of special construction. Each spacer or separator consists of two acid-proof perforated plates 5 and 6 of non-conducting material. The plates 5 are flat on both faces, while the plates 6 are provided with ribs 7 which determine the distance between the separator plates of each pair. The material preferably employed in the plates 5 and 6 is a hard rubber compound, but I do not expressly limit myself to such material. The compound is sufficiently elastic to permit such expansion and contraction of the battery elements as will occur in the ordinary use of the battery, and the perforations of small size to prevent particles of the paste coating on the battery elements from becoming detached from the lead backing and passing through the perforations. The perforations are as numerous as possible consistent with sufficient strength of the separator plates, thus permitting free circulation of the electrolyte.

In assembling the elements of a storage battery cell according to my invention, the mode of procedure is clearly indicated in Fig. 2. The bolts are simply thrust through one of the outside elements of the series, then a pair of separator plates are placed on the bolts, then the next element of the series, and so on until the entire series of elements and alternately arranged separator plates are in position on the insulated bolts. The nuts are then screwed on until the elements and separator plates are held with sufficient firmness, and the elements are then ready for introduction into the cell.

For the sake of simplicity in manufacture, I preferably construct the spacers exactly as above described, forming the plates 5 without any ribs and making them entirely separate from the ribbed plates 6. It will, however, be obvious that if the ribbed plates 6 and the plain plates 5 are pressed together and slightly heated the plates 5 will become united with the ribs 7 upon the plates 6, thus making each spacer a unitary structure.

Having thus described my invention, what I claim as new and desire to secure by Letters Patent, is:

1. A unit for a storage battery cell, comprising a plurality of apertured electrodes, apertured separators therebetween, each separator comprising a flat perforated plate and a second perforated plate with coöperative channel-forming ribs thereon; the apertures of said separators being spaced to intercept certain of said ribs, and non-short-circuiting, binding-means passing through said apertures.

2. A unit for a storage battery cell, comprising a plurality of apertured electrode plates, the outer plates having integral stiffening ribs on their exposed surfaces, apertured separators between said electrode plates, each separator comprising a flat perforated plate and a second perforated plate provided with ribs which contact with said flat plate; the apertures of said separators being spaced to intercept certain of said ribs, and non-short-circuiting binding-means passing through said apertures and secured outside of the stiffening ribs.

In testimony whereof, I have signed my name in the presence of two witnesses.

CHARLES S. COLE.

Witnesses:
 CHAS. A. PEALE,
 W. T. COLE.